United States Patent
Yu et al.

(10) Patent No.: US 11,153,853 B2
(45) Date of Patent: Oct. 19, 2021

(54) SIDELINK CONTROL INFORMATION INDICATION

(71) Applicant: Motorola Mobility LLC, Chicago, IL (US)

(72) Inventors: Xiaodong Yu, Beijing (CN); Haipeng Lei, Beijing (CN); Chenxi Zhu, Beijing (CN); Zhi Yan, Beijing (CN); Hongchao Li, Beijing (CN)

(73) Assignee: Motorola Mobility LLC, Chicago, IL (US)

(*) Notice: Subject to any disclaimer, the term of this patent is extended or adjusted under 35 U.S.C. 154(b) by 45 days.

(21) Appl. No.: 16/611,117

(22) PCT Filed: May 5, 2017

(86) PCT No.: PCT/CN2017/083225
§ 371 (c)(1),
(2) Date: Nov. 5, 2019

(87) PCT Pub. No.: WO2018/201448
PCT Pub. Date: Nov. 8, 2018

(65) Prior Publication Data
US 2020/0236666 A1    Jul. 23, 2020

(51) Int. Cl.
*H04W 72/04* (2009.01)
*H04W 72/12* (2009.01)
*H04L 1/18* (2006.01)

(52) U.S. Cl.
CPC ....... *H04W 72/0406* (2013.01); *H04L 1/1812* (2013.01); *H04W 72/0446* (2013.01); *H04W 72/1278* (2013.01)

(58) Field of Classification Search
None
See application file for complete search history.

(56) References Cited

U.S. PATENT DOCUMENTS

2013/0142268 A1* 6/2013 Gao .................... H04L 5/14
375/252
2015/0327315 A1* 11/2015 Xue ..................... H04L 5/0005
370/330

(Continued)

FOREIGN PATENT DOCUMENTS

CN     105813204 A      7/2016
WO     2015/122629 A1   8/2015

(Continued)

OTHER PUBLICATIONS

PCT/CN2017/083225, Notification of Transmittal of the International Search Report and the Written Opinion of the International Searching Authority, or the Declaration, dated Sep. 30, 2017, pp. 1-11.

(Continued)

*Primary Examiner* — Anh Vu H Ly
(74) *Attorney, Agent, or Firm* — Kunzler Bean & Adamson

(57) ABSTRACT

Apparatuses, methods, and systems are disclosed for sidelink control information indication. One apparatus includes a receiver that receives a second control information message from a remote unit over sidelink communication. Here, the second control information message is in response to the remote unit receiving one or more data processes scheduled by a first control information message from a relay unit. The apparatus also includes a processor that determines a transmission-reception pattern for the sidelink communication and generates an indicator of the determined transmission-reception pattern. The apparatus further includes a transmitter that transmits the indicator of the determined transmission-reception pattern to the remote unit in a third control information message.

20 Claims, 8 Drawing Sheets

(56) References Cited

U.S. PATENT DOCUMENTS

| | | | |
|---|---|---|---|
| 2016/0037551 A1* | 2/2016 | Lei | H04L 5/14 370/280 |
| 2016/0338094 A1* | 11/2016 | Faurie | H04W 72/14 |
| 2017/0230937 A1* | 8/2017 | Nguyen | H04W 48/20 |
| 2017/0295601 A1* | 10/2017 | Kim | H04W 72/0406 |
| 2017/0353819 A1* | 12/2017 | Yin | H04L 47/30 |
| 2018/0069664 A1* | 3/2018 | Khoryaev | H04L 1/1812 |
| 2018/0110037 A1* | 4/2018 | Yasukawa | H04W 76/14 |
| 2018/0213531 A1* | 7/2018 | Kim | H04L 1/1854 |
| 2018/0213577 A1* | 7/2018 | Burbidge | H04W 76/10 |
| 2019/0373652 A1* | 12/2019 | Hong | H04W 88/04 |

FOREIGN PATENT DOCUMENTS

| | | |
|---|---|---|
| WO | 2016/181094 A1 | 11/2016 |
| WO | 2017029646 A1 | 2/2017 |

OTHER PUBLICATIONS

Intel Corporation, "Considerations on Sidelink Communication Enhancements for Wearable and IoT Use Cases", 3GPP TSG RAN1 WG Meeting #88bis R1-1704706, Apr. 3-7, 2017, pp. 1-7.

Huawei, Hisilicon, "Discussion on enhancement on communication" 3GPP TSG RAN WG1 Meeting #88bis R1-1704308, Apr. 3-7, 2017, pp. 1-3.

3GPP, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.2.0, Mar. 2017, pp. 1-197.

3GPP, "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, pp. 1-194.

Huawei, Hilsilcon, "Discussion on SCI contents for V2V", 3GPP TSG RAN WG1 Meeting #85 R1-164103, May 23-27, 2016, pp. 1-6.

Ericsson, "On Scheduling Assignments and Receiver Behaviour". 3GPP TSG-RAN WG1 Meeting #76bis R1-141391, Mar. 31-Apr. 4, 2014, pp. 1-6.

Huawei, Hilsilcon, "Scheduling assignment design for V2V", 3GPP TSG RAN WG1 Meeting #86 R1-166202, Aug. 22-26, 2016, pp. 1-4.

Huawei, Hilsilcon, Stage-3 issues for PC5 based V2V, 3GPP TSG-RAN WG2 Meeting #94 R2-163809, May 23-27, 2016, pp. 1-6.

* cited by examiner

| Transmission-to-Reception configuration | Transmission-to-Reception Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | T | R | R | R | R | T | R | R | R | R |
| 1 | 5 ms | T | T | R | R | R | T | T | R | R | R |
| 2 | 5 ms | T | T | T | R | R | T | T | T | R | R |
| 3 | 5 ms | T | T | T | T | T | T | R | T | T | R |
| 4 | 10 ms | R | R | R | R | R | R | R | R | R | T |
| 5 | 10 ms | | | | | | | | | | |
| 6 | Reserved | | | | | | | | | | |
| 7 | Reserved | | | | | | | | | | |

FIG. 3

SIDELINK CONTROL INFORMATION INDICATION

FIELD

The subject matter disclosed herein relates generally to wireless communications and more particularly relates to providing sidelink control information indication.

BACKGROUND

The following abbreviations and acronyms are herewith defined, at least some of which are referred to within the following description.

Third Generation Partnership Project ("3GPP"), Positive-Acknowledgment ("ACK"), Channel State Information ("CSI"), Control Channel ("CCH"), Device-to-Device ("D2D"), Downlink Control Information ("DCI"), Downlink ("DL"), Downlink Pilot Time Slot ("DwPTS"), Evolved Node B ("eNB"), European Telecommunications Standards Institute ("ETSI"), Frequency-Division Multiplexing ("FDM"), Frequency Division Multiple Access ("FDMA"), Guard Period ("GP"), Hybrid Automatic Repeat Request ("HARQ"), Long Term Evolution ("LTE"), LTA Advanced ("LTE-A"), Medium Access Control ("MAC"), Multiple Access ("MA"), Modulation Coding Scheme ("MCS"), Mobility Management Entity ("MME"), Machine Type Communication ("MTC"), Narrowband ("NB"), Negative-Acknowledgment ("NACK") or ("NAK"), Next Generation Node B ("gNB"), Orthogonal Frequency Division Multiplexing ("OFDM"), Packet Data Convergence Protocol ("PDCP"), Packet Data Network ("PDN"), PDN Gateway ("P-GW"), Physical Broadcast Channel ("PBCH"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Radio Resource Control ("RRC"), Receive ("RX"), Serving Gateway ("S-GW"), Scheduling Assignment ("SA"), Scheduling Request ("SR"), Shared Channel ("SCH"), Sidelink Control Information ("SCI"), System Information Block ("SIB"), Transport Block ("TB"), Transport Block Size ("TBS"), Transmission Control Protocol ("TCP"), Time-Division Multiplexing ("TDM"), Transmission and Reception Point ("TRP"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Uplink Pilot Time Slot ("UpPTS"), Vehicle-to-Vehicle ("V2V"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In mobile communication networks, a remote UE may operate in an indirect communication mode where the remote UE accesses mobile network communication services via a relay UE. Both D2D and V2V communications are broadcast-based communications. However, broadcast-based communications do not meet requirements on QoS, reliability, complexity and power consumption.

BRIEF SUMMARY

Methods for sidelink control information indication are disclosed. Apparatuses and systems also perform the functions of the methods. One method of a relay UE for sidelink control information indication includes receiving a second control information message from a remote unit over sidelink communication. Here, the second control information message is in response to the remote unit receiving one or more data processes scheduled by a first control information message from a relay unit. The method includes determining a transmission-reception pattern for a remote unit using sidelink communication and generating an indicator of the determined transmission-reception pattern. The method further includes transmitting the indicator to the remote unit in a third control information message.

One method of a remote UE for sidelink control information indication includes receiving an indicator of a transmission-reception pattern in a first control information message and receiving an indicator of scheduling assignment transmitted in the first control information message and associated data transmitted in a data channel from a relay unit. The method also includes generating an indicator of hybrid automatic repeat request ("HARQ") feedback information in response to receiving one or more data processes and determining a transmission subframe of the apparatus based on the received indicator of a transmission-reception pattern. The method further includes transmitting the indicator of HARQ feedback information to the relay unit in a second control information message on a remote unit transmission subframe determined from the transmission-reception pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a table illustrating one embodiment of predetermined transmission-reception patterns for sidelink control information indication;

DETAILED DESCRIPTION

Figure 1:
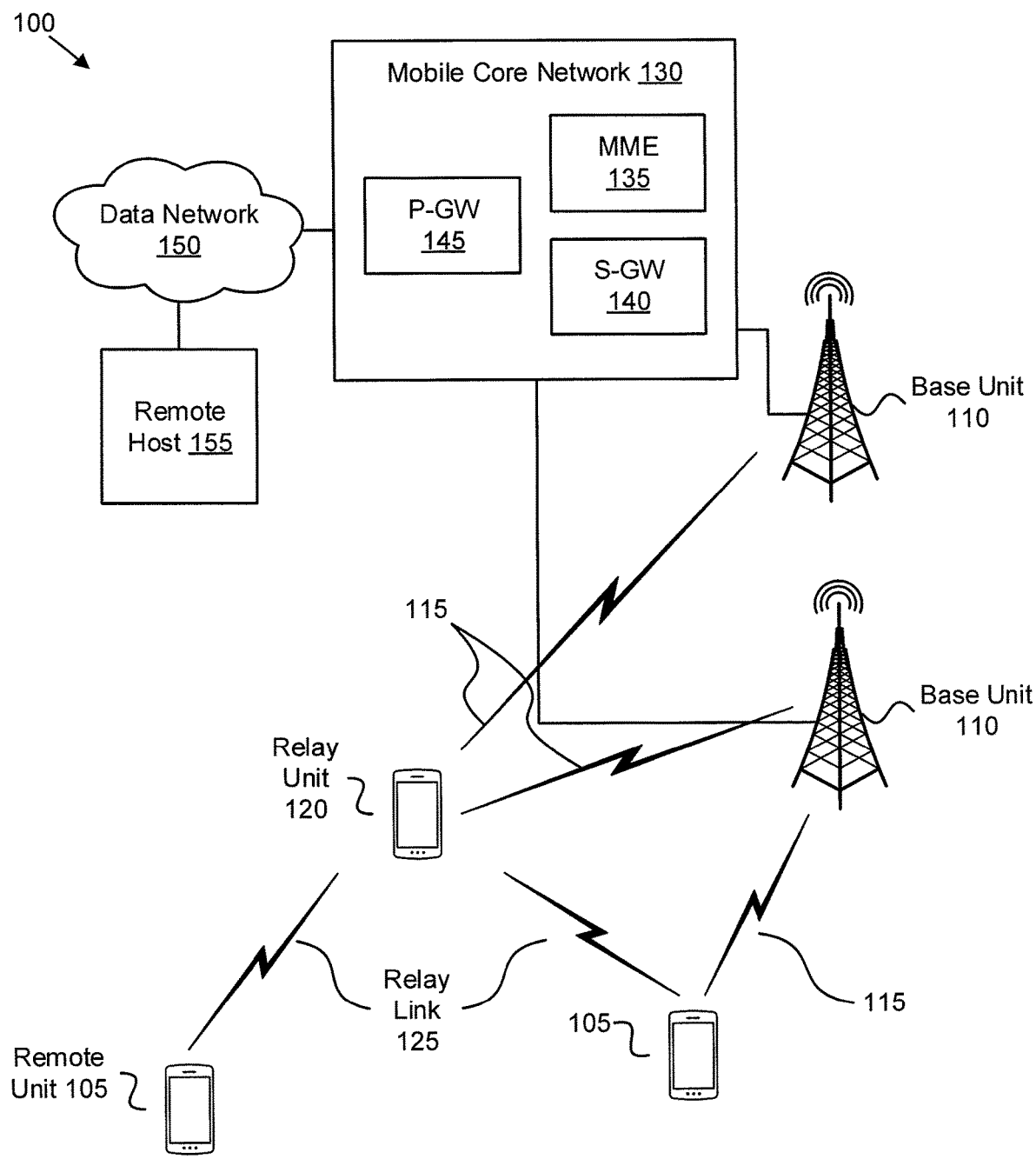
FIG. 1 is a schematic block diagram illustrating one embodiment of a wireless communication system for sidelink control information indication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to meet requirements on QoS, reliability, complexity and power consumption, unicast-based sidelink communications are provided. Disclosed herein are methods, apparatus, and systems that support a relay UE to perform the resource allocation for sidelink communication, indicate the data transmission and/or feedback information transmission from the remote UE. As described herein, the relay UE determines a transmission-reception pattern and generates an indicator of the same. The transmission-reception pattern indicator allows a remote UE to identify a relay UE reception frame, where the remote UE is permitted to transmit data and/or HARQ feedback information. Additionally, the relay UE and/or remote UE may send SCI that contains a scheduling assignment function differentiation flag that to differentiate an associated data transmission from a feedback ACK/NACK information transmission.

FIG. 1 depicts a wireless communication system 100 for sidelink control information indication, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the LTE, LTE advanced and subsequent cellular network system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115. In addition, the remote units 105 may communicate indirectly with a base unit 110 via a relay unit 120. Here, a relay unit 120 communicates with one or more remote units 105 using sidelink communication signals carried over one or more relay links 125. A relay unit 120 is a remote unit 105 that also serves as a relay for one or more additional remote units 105.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. The base units 110 communicate directly with the one or more relay units 120 via the communication signals. Generally, the base units 110 transmit downlink ("DL") communication signals to serve the remote units 105 and/or relay units 120 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 (and/or relay units 120) and one or more of the base units 110.

The wireless communication system 100 includes one or more relay units 120 capable of relaying traffic of the remote units 105 to the base units 110. As noted above, the relay units 120 are remote units 105 capable of relaying the traffic between a base unit 110 and another remote unit 105. As such, a relay unit maintains its own network connections. In one embodiment, a relay unit 120 may communicate with a remote host 155 via a network connection with a base unit 110 and the mobile core network 130. The remote units 105 and relay units 120 communicate using relay links 125. In one embodiment, the relay links 125 may be any suitable carrier in licensed or unlicensed radio spectrum. Examples of relay links 125 include, but are not limited to LTE-direct links, WiFi-direct links, and the like.

In one embodiment, the mobile core network 130 is an evolved packet core ("EPC"). In another embodiment, the mobile core network 130 may be a 5G core network. The mobile may be coupled to a data network 150, like the Internet and private data networks, among other data networks. In some embodiments, the remote units 105 and/or relay units 120 communicate with a remote host 155 via a network connection with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network elements. As depicted, the mobile core network 130 includes at least one MME 135, at least one S-GW 140, and at least one P-GW 145. Although a specific number of MMEs 135, S-GWs 140, and P-GWs 145 are depicted in FIG. 1, one of skill in the art will recognize that any number of MMEs 135, S-GWs 140, and P-GWs 145 may be included in the mobile core network 130.

The MME 135 is a control plane network element that handles signaling related to mobility and security for the remote unit 105. The MME 135 is a termination point for a NAS connection of the remote unit 105 to the mobile core network 130. The S-GW 140 is a user plane element that connects the RAN to the mobile core network 130. The S-GW 140 serves the remote unit 105 by routing incoming/outgoing IP packets. The P-GW 145 is a user plane element that connects the mobile core network 130 to an external (IP) network, such as the data network 150.

As depicted, a relay unit 120 may provide a remote unit 105 with access to a base unit 110. A relay unit 120 used sidelink communications to communicate with one or more remote units 105. To facilitate the sidelink communication, the relay unit 120 may indicate a transmission-reception pattern to the remote unit 105, e.g., using sidelink control information ("SCI") sent on a PSCCH, as discussed in greater detail below. Additionally, the remote unit 105 and/or relay unit 120 may indicate whether a SCI message includes feedback information and/or is associated with a data transmission on the sidelink data channel, as discussed in greater detail below.

Figure 2:
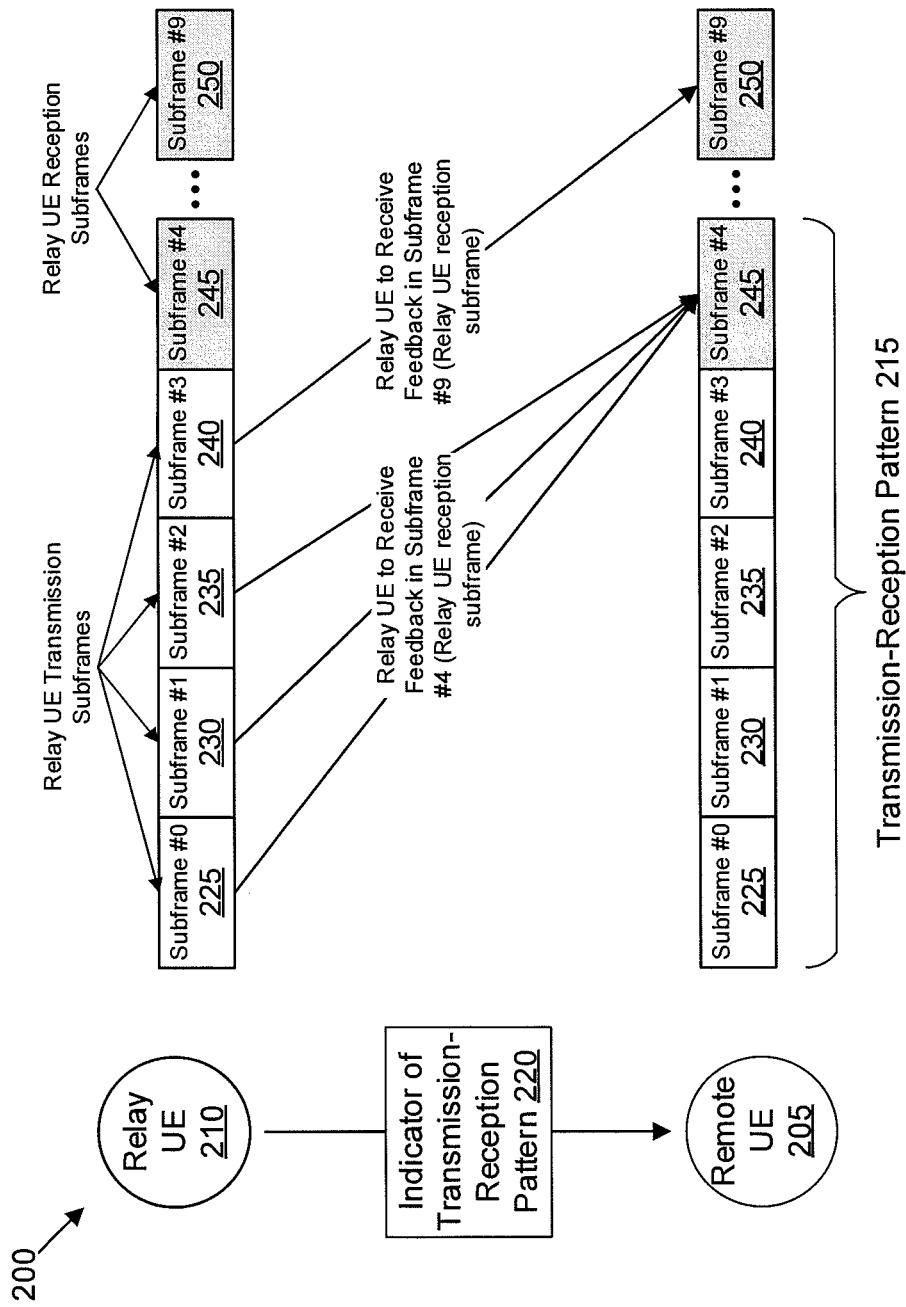
FIG. 2 is a block diagram illustrating one embodiment of communication between a remote UE and a relay UE for sidelink control information indication.

FIG. 2 depicts communication 200 for sidelink control information indication between a remote UE 205 and a relay UE 210, according to embodiments of the disclosure. The remote UE 205 may be one embodiment of a remote unit 105, while the relay UE 210 may be one embodiment of a relay unit 120. The remote UE 205 and relay UE 210 communicate using sidelink communication over a D2D connection. Here, the sidelink communication includes a plurality of subframes 225-250. As depicted, a first portion of the subframes are Relay UE Transmission subframes and a second portions of the subframes are Relay UE Reception subframes. During a Relay UE Transmission subframe, the relay UE 210 is scheduled to transmit data, signaling, feedback information, and the like to one or more remote UEs 205. During a Relay UE Reception subframe, the relay UE 210 is scheduled to receive data, signaling, feedback information, and the like from the one or more remote UEs.

The number and location of the Relay UE Transmission subframes and Relay UE Reception subframes forms the transmission-reception pattern 215 for the sidelink communication. In order for the remote UE 205 and the relay UE 210 to successfully communicate each must know the transmission-reception pattern 215. In the depicted embodiment, the relay UE 210 generates the transmission-reception pattern 215 and transmits an indicator of the transmission-reception pattern (item 220) to the remote UE 205.

In this case, when the relay UE 210 transmits a data transmission, the relay UE 210 needs to determine and generate an indicator 220 of the transmission-reception pattern 215 so that the remote UE 205 can identify at least one Relay UE Reception subframe, as shown in FIG. 2. The remote UE 205 provides feedback of the decoding status (e.g., HARQ ACK/NACK) of one or more data transmission(s) it receives from the relay UE 210.

First, the relay UE 210 determines the transmission-reception pattern 215 for sidelink communication between one or more remote UE(s) 205. After determining the transmission-reception pattern 215, the relay UE 210 generates an indicator 220 of the transmission-reception pattern. In some embodiments, the indicator 220 of the transmission-reception pattern is transmitted in a sidelink control information ("SCI") message.

In some embodiments, the relay UE 210 determines the transmission-reception pattern 215 by selecting from a set of predefined patterns. FIG. 3 shows a table of eight different predefined patterns. In certain embodiments, the transmission-reception pattern 215 is selected based on the ratio of payload size to be transmitted between relay UE 210 and remote UE 205 on sidelink.

The payload size of the relay UE 210 is based on the payload size to be transmitted from the relay UE 210 to the remote UE 205. The payload size of the remote UE 205 is based on the payload size to be transmitted from the remote UE 205 to the relay UE 210. The information of payload (size) of the remote UE 205 may be obtained via a SR (scheduling request) or a BSR (Buffer Status Report) received by an eNB or relay UE 210.

The buffer status of the relay UE 210 is used for the relay UE 210 to determine the number of relay UE transmission subframes (e.g., the number of reception subframes for the remote UE 205). The information of buffer status of the relay UE 210 is based on triggered traffic on the relay UE 210 side. The buffer status report ("BSR") of the remote UE 205 is based on the triggered traffic on the remote UE 205 side. The remote UE 205 reports the BSR to the relay UE 210 in a BSR MAC control element (e.g., transmitted in UL data channel for legacy UE to eNB transmission). After receiving the BSR of the remote UE 205, the relay UE 210 may determine the number of relay UE reception subframe (e.g., the number of transmission subframes for the remote UE).

In certain embodiments, the transmission-reception pattern 215 is generated by the relay UE 210 and may or may not conform to one of the predefined patterns. Here, the generated transmission-reception pattern 215 may also be based on the ratio of payload size to be transmitted between relay UE 210 and remote UE 205 on sidelink.

As depicted in FIG. 2, the relay UE 210 transmits data to the remote UE 205 in four subframes 225-240 and the remote UE 205 receives the data during these subframes. Here, the remote UE 205 is to respond to the four subframes transmissions in one subframe. In the depicted embodiment, the payload size ratio is 4:1 and the transmission-reception pattern 215 is four transmission subframes on relay UE 210 side to one reception subframe on relay UE 210 side. In certain embodiments, the transmission-reception pattern 215 may be represented in bitmap manner, e.g., 5 bits (11110), in sidelink control information. Here, a value of "1" in the bitmap indicates that the subframe is a Relay UE Transmission subframe, while a value of "0" indicates that the subframe is a Relay UE Reception subframe.

While the embodiments of FIG. 2 depict the relay UE 210 determining the transmission-reception pattern 215, in other embodiments the transmission-reception pattern 215 may be generated by the eNB, e.g., based on the ratio of payload size to be transmitted between relay UE 210 to and remote UE(s) 205 on sidelink. In such embodiments, the transmission-reception pattern 215 is then transmitted from the eNB (not shown) to the relay UE 210. Alternatively, the eNB may transmit the transmission-reception pattern 215 to both relay UE 210 and remote UE(s) 205 by downlink control information.

In one embodiment, the indicator 220 of the transmission-reception pattern may be an indication of one or more next reception subframes on the relay UE 210 side (e.g., indicate Relay UE Reception subframes). Here, the relay UE 210 may determine the next one reception subframe (e.g., to receive the transmission from the remote UE 205) and then the relay UE 210 generates an indicator of next one reception subframe pattern. For example, a 4-bit value of "0111" may be included in SCI to indicate that the n+7 subframe is used for relay UE 210 reception (i.e., receiving and detecting remote UE 205 transmission). Generally, the indicator of a next reception subframe must point to a subframe far enough ahead in time for the remote UE 205 to process the SCI and switch to transmission mode.

In the depicted embodiment, the relay UE 210 may send an indicator with a value of "0100" (binary "4") during subframe #0 (subframe 225) to indicate that the next relay UE reception subframe is n+4 subframes away (e.g., the next UE reception subframe is subframe #4). Similarly, in subframe #1 (subframe 230) the indicator may have a value of "0011" (binary "3") and in subframe #2 (subframe 235) the indicator may have a value of "0010" (binary "2"), each indicator pointing to the subframe #4 (subframe 245) as the next relay UE reception subframe.

However, in subframe #3 (subframe 240), there is insufficient processing time to point to the subframe #4 (subframe 245). Thus, in subframe #3 (subframe 240) the indicator may have a value of "0110" (binary "6") to indicate that the next relay UE reception subframe is n+4 subframes away (e.g., the next UE reception subframe is subframe #9). In another embodiment, the indicator 220 of the transmission-reception pattern may be an indication of one or more next transmission subframes on the relay UE 210 side (e.g., indicate Relay UE Transmission subframes).

FIG. 3 depicts a table 300 with predetermined transmission-reception patterns 325. Here, 'T' represents the transmission subframe(s) on relay UE 210 side and 'R' represents the reception subframe(s) on relay UE 210 side). The table 300 includes a transmission-to-reception configuration 305. Each transmission-to-reception configuration 305 corresponds to one of the predetermined transmission-reception patterns 325. The relay UE 210 may send, as the indicator 220, a binary value corresponding to the transmission-to-reception configuration 305.

The table 300 also includes transmission-to-reception switch-point periodicity information 310 when indicates a periodicity with which a predetermined transmission-reception pattern 325 switches from relay UE transmission to relay UE reception, and back again. For example, the transmission-reception pattern 215 shown in FIG. 2 may correspond to the transmission-to-reception configuration #3 and have a transmission-to-reception switch-point periodicity of 5 ms (each subframe being 1 ms in duration).

Returning to FIG. 2, the relay UE 210 transmits the indicator 220 of the transmission-reception pattern to the remote UE 205. In some embodiments, the indicator 220 is sent in a SCI message. The indicator 220 of pattern may be represented by a plurality of bits (e.g., 3, 4 or 5 bits) in the SCI. As a first example, a bitmap indicator 220 of the transmission-reception pattern may use 5 bits to represent the transmission-reception pattern 215 in the following 5 subframes. As mentioned above, a '1' may be used to represent a transmission subframe and a '0' may be used to represent a reception subframe. Using this convention, the transmission-reception pattern 215 may be indicated using the bitmap "11110".

In another embodiment, the indicator 220 of the transmission-reception pattern may use one or more bits to indicate the next one reception subframe (or alternative the next one transmission subframe). As mentioned above, a four-bit indicator 220 of "0111" may be used to indicate that the n+7 subframe is used for relay UE 210 reception (e.g., the remote UE 205 may transmit data or feedback information in this subframe). Alternatively, a three-bit indicator 220 of "110" may be used to indicate that the n+6 subframe is to be used for relay UE transmission (e.g., the remote UE 205 is to receive data or feedback information in this subframe).

In certain embodiments, the indicator 220 may include one or more bits representing one of a set of pre-defined transmission-reception patterns 215. For example, a three-bit indicator 220 may be used to represent one of a set of pre-defined pattern configurations in FIG. 3. Specifically, an indicator 220 of '100' indicates the transmission-to-reception configuration #4 where the first nine subframes (subframe 0-8) in one frame (10 ms) are used for relay UE 210 transmission and the last subframe (subframe 9) is used for relay UE 210 reception.

In certain embodiments, the indicator 220 may include additional information. In a first example, an indicator of scheduling assignment ("SA") may indicate a time/frequency resource of feedback information. In a second example, an indicator of SA may indicate a time offset and/or frequency offset based on the transmission resource of the relay UE 210. In a third example, an indicator of SA may indicate the time offset only. Here, the frequency resource is same as relay UE 210 transmission (SA and/or data) resource. In a fourth example, the time offset is preconfigured or fixed (e.g., n+4) and the frequency resource is same as the relay UE 210 transmission (SA and/or data) resource. In a fifth example, the indicator 220 may indicate a preconfigured or fixed time/frequency offset for resource hopping.

As discussed above, the relay UE 210 may send the indicator 220 of the transmission-reception pattern in a SCI message. Besides the indicator 220 of the transmission-reception pattern, the SCI transmitted from relay UE 210 to remote UE 205 may include a flag for scheduling assignment function differentiation. The SA function differentiation flag may be a 1- or 2-bit flag used to differentiate a SA is used to indicate its associated data transmission from a feedback ACK/NACK information transmission. The SA function differentiation flag aids the remote UE 205 in interpreting the SCI message.

In some embodiments, the SA function differentiation flag is a 1-bit flag that indicates whether this SCI includes only an indication of feedback information transmission or whether it includes both an indication of data transmission and an indication of feedback information transmission. For example, a value of '0' may indicate that the SCI message contains an indication of feedback information, while a value of '1' may indicate that this SCI message include both an indication of data transmission and the indication of feedback information. Alternatively, a value of '1' may indicate that this SCI includes only an indication of feedback information, while a value of '0' may indicate that this SCI includes both an indication of data transmission and an indication of feedback information. The SA function differentiation flag is further explained with reference to FIG. 4.

Figure 4:
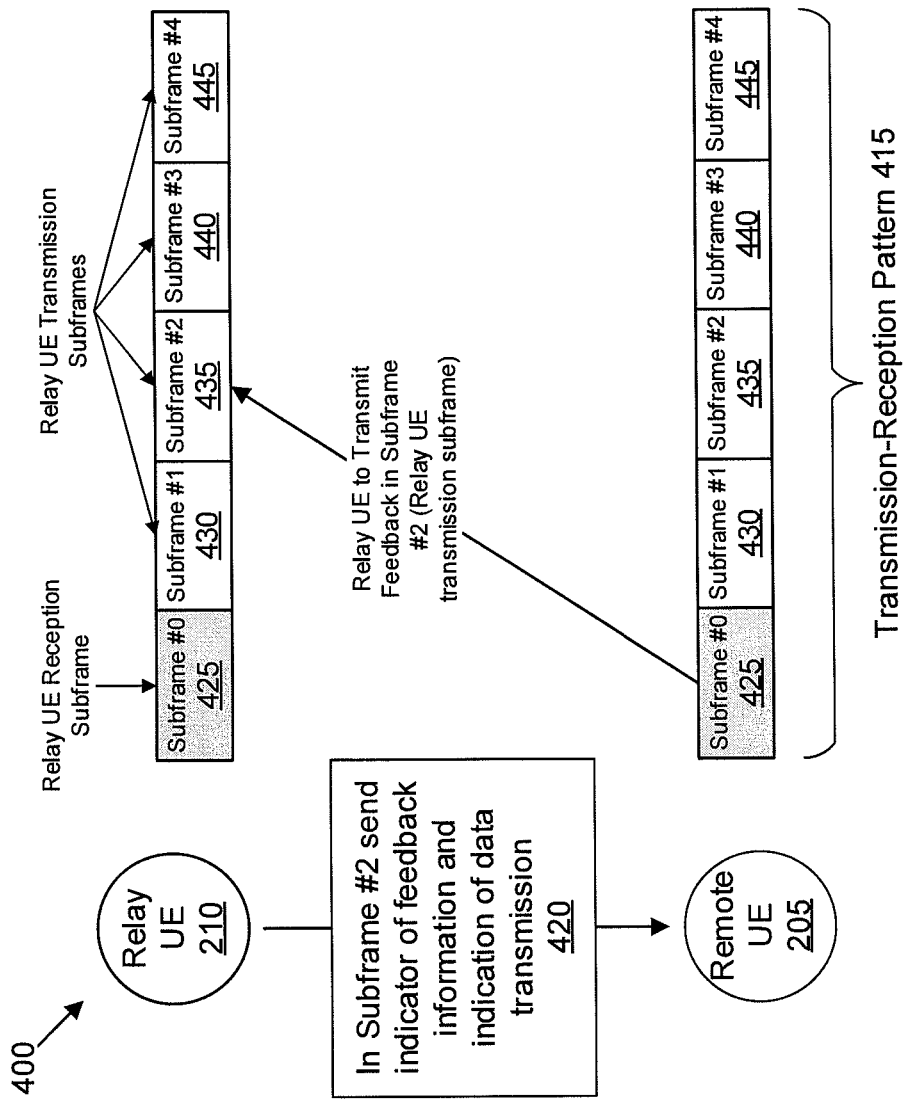
FIG. 4 is a block diagram illustrating another embodiment of communication between a remote UE and a relay UE for sidelink control information indication.

FIG. 4 depicts communication 400 for sidelink control information indication between the remote UE 205 and the relay UE 210, according to embodiments of the disclosure. Note that the remote UE 205 and the relay UE 210 communicate over sidelink using a transmission-reception pattern 415 where the subframe 425 (subframe #0) is a Relay UE Reception Subframe and the subframes 430-445 are Relay UE Transmission Subframes.

As depicted, the relay UE 210 receives a data transmission from the remote UE 205 in subframe #0 (subframe 425) and attempts to transmit feedback information (e.g., HARQ feedback) corresponding to subframe #0 (subframe 425) in subframe #2 (relay UE 210 transmission subframe). However, the remote UE 205 does not know a priori (e.g., it cannot foresee) whether the relay UE 210 has data to be transmitted in subframe #2 to remote UE 205 or whether the relay UE 210 only has feedback information to transmit. Here, the SA function differentiation flag is included in SCI transmitted by the relay UE 210 so that the remote UE 205 is able to determine whether the SCI transmitted in subframe #2 includes an indication of feedback information transmission only or whether this SCI includes both an indication of data transmission and an indication of feedback information.

In certain embodiments, the SA function differentiation flag may be a 1-bit flag to indicate whether this sidelink control information includes an indication of data transmission or whether this sidelink control information includes ACK/NACK feedback information. In such embodiments, the SCI will not have both an indication of data transmission and ACK/NACK feedback information. For example, a value of '0' may indicate that this SCI includes an indication of data transmission only, while a value of '1' may indicate that this SCI includes an indication of feedback information only. Alternatively, a value of '1' may indicate that this SCI includes an indication of data transmission only, while a value of '0' may indicate that this SCI includes an indication of feedback information only.

In some embodiments, the SA function differentiation flag may be a 2-bit flag that indicates whether this SCI includes an indication of data transmission only (e.g., indicated using a value of '00'), whether this SCI includes an indication of feedback information transmission only (e.g., indicates using a value of '01'), or whether this SCI includes both an indication of data transmission and feedback information transmission (e.g., indicated using a value of '10'). As only three scenarios are mapped, one value of the 2-bit flag (e.g., the value '11') is reserved (e.g., not to be used).

In some embodiments, the content of the SCI varies based on the SA function differentiation flag. For example, if the flag for SA function differentiation is set to indicate data transmission only, then the SCI should include the following bits to indicate data transmission relevant information: a HARQ process number (e.g., 3 bits); a resource allocation indication of SA associated data (e.g., 12 bits); a time gap between the SA and its associated data (e.g., 4 bits), a frequency resource location of SA associated data (e.g., 8 bits), or some combination thereof; a modulation and coding scheme (e.g., 5 bits); a modulation and coding scheme of SA associated data (e.g., 5 bits); and a new data indicator (e.g., 1 bit). Note that the time gap information is used to support FDM between PSCCH/PSSCH from the system perspective, but TDM from the UE perspective.

As another example, if the flag for SA function differentiation is set to indicate ACK/NACK feedback information only, then the SCI may be modified to indicate ACK/NACK feedback relevant information. Here, the above bits of HARQ process number (3 bits) and modulation and coding scheme (5 bits), may be used to indicate ACK/NACK feedback in bit manner. Moreover, these 8 bits may represent the decoding status of 8 HARQ process numbers in bitmap manner, e.g., using '1' to represent ACK status and '0' to represent NACK status. Here, one or more of these bits may be used to indicate DTX status where the remote UE 205 did not use this HARQ process number for transmission. Accordingly, if the remote UE 205 transmitted the data transmission with HARQ process number, it will check the corresponding HARQ process number bit of 8 bits. Here, the value of '01111011' can represent HARQ process #7 and #2 are decoded unsuccessfully or didn't used for transmission, while the other processes (e.g., #6, #5, #4, #3, #1, and #0) are decoded successfully.

As yet another example, if the flag for SA function differentiation is set to indicate both ACK/NACK feedback information and data transmission together, then the SCI may indicate both data transmission relevant information and ACK/NACK feedback relevant information. In certain embodiments, this may require new bit fields to be defined for HARQ ACK/NACK feedback in SCI. Here, a new 8-bit field may be defined to convey HARQ feedback information in the manner described above.

Figure 5:
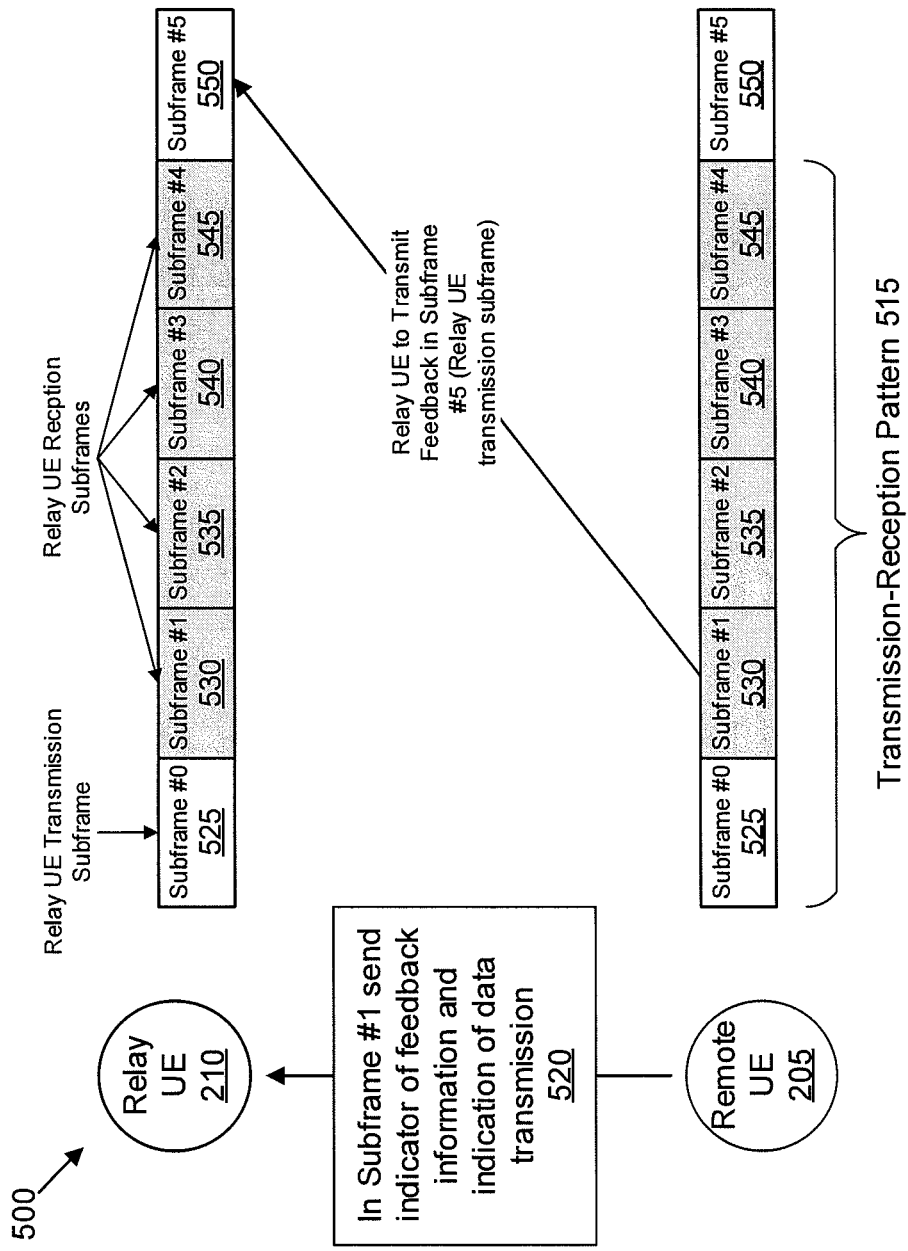
FIG. 5 is a block diagram illustrating another embodiment of communication between a remote UE and a relay UE for sidelink control information indication.

FIG. 5 depicts communication 500 for sidelink control information indication between the remote UE 205 and the relay UE 210, according to embodiments of the disclosure. Here, the remote UE 205 sends SCI and associated data to the relay UE 210. To do so, the remote UE 205 first determines the transmission subframe for sidelink communication based on transmission and reception configuration (e.g., based on the transmission-reception pattern 515). In one embodiment, the transmission and reception configuration may be received from relay UE 210 in sidelink control information. For example, the relay UE 210 may send SCI containing the indicator 220 of the transmission-reception pattern discussed above. In another embodiment, the transmission and reception configuration may be received from an eNB (not shown) in downlink control information. Here, the remote UE 205 determines to transmit SCI containing an indicator of feedback information and an indicator of associated data in subframe 530 ("Subframe #1).

Next, the remote UE 205 generates an indicator of HARQ feedback information based on the decoding status of each relay UE 210 transmission subframe. As discussed above, the indicator of HARQ feedback information may be a bitmap (e.g., 8-bit bitmap), e.g., using '1' to represent ACK status and '0' to represent NACK status. Because the relay UE 210 cannot know ahead of time whether the remote UE 205 will transmit feedback information, an indicator of data transmission, or both feedback information and an indicator of data transmission in the SCI of Subframe #1 (subframe 530), the generates a flag for SA function differentiation. Here, the SA function differentiation flag generated by the remote UE 205 is substantially as that generated by the relay UE 210 described above.

Because there is an associated data transmission (e.g., the remote UE 205 transmits data on same subframe), the remote UE 205 generates the additional data transmission relevant information in SCI as discussed above. Then in Subframe #1, the remote UE 205 transmits the indicator 520 of (HARQ) feedback information and indication of associated data transmission in SCI. Here, the remote UE 205 transmits the associated data using the sidelink data channel.

In some embodiments, the remote UE 205 and/or the relay UE 210 may reuse the SCI format 1 when sending the above described indicators in SCI. Here, certain bit fields of the SCI format 1 are replaces with the above described indicators, requiring a receiving UE to reinterpret the SCI format 1 in order to receive the indicators.

Generally, the SCI format 1 contains 3 bits of priority information, 4 bits of resource reservation, a system-specific number of bits of frequency resource location of initial transmission and retransmission (e.g., using $\lceil \log_2 (N_{subchannel}^{SL}(N_{subchannel}^{SL}+1)/2) \rceil$ bits, where $N_{subchannel}^{SL}$ refers to the number of subchannels allocated for sidelink communication), 4 bits of time gap information (time gap between initial transmission and retransmission), 5 bits of modulation and coding scheme information, 1 bit for a retransmission index, and a balance of reserved information bits so that the size of the SCI format 1 message is 32-bits in total (the reserved bits are typically set to '0').

In order to reuse the SCI format 1 message to indicate a transmission-reception pattern, HARQ ACK/NACK feedback information, the SA function differentiation flag, and other information discussed above, one or more bit fields may be used to carry new information. In some embodiments, the 3 bits of priority information may be used to represent the HARQ process number (a 3-bit value) and the retransmission index may be used to represent the new data indicator. In certain embodiments, the 4 resource reservation bits may be used to indicate the transmission-reception pattern. Where the transmission-reception pattern can be represented with 3 bits, the remaining resource reservation bit may be used to represent the SA function differentiation flag. In other embodiments, the reserved information bits may be used to indicate the transmission-reception pattern and SA function differentiation flag.

In some embodiments, the priority bits and modulation and coding scheme bits may be used to represent the decoding status (HARQ ACK/NACK) of 8 HARQ process number in bitmap manner as discussed above. Additionally (or alternatively) bits of the reserved information bits may be used to indicate the HARQ ACK/NACK feedback indication.

Figure 6:
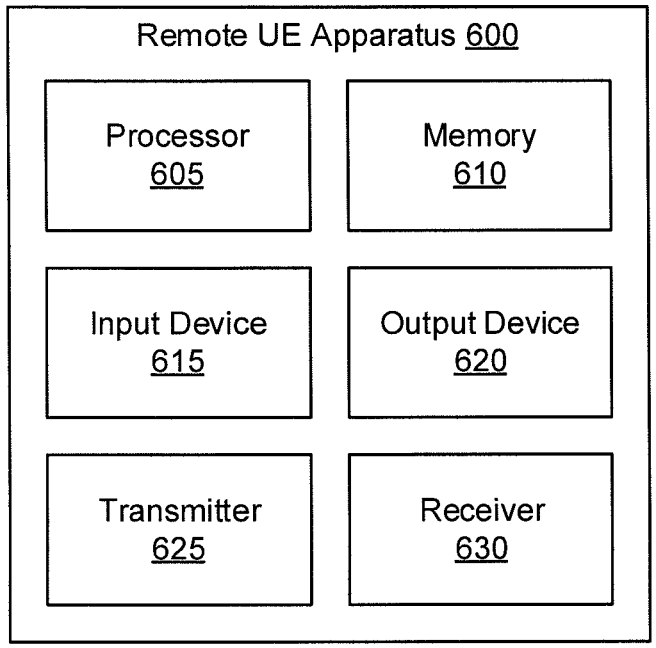
FIG. 6 is a schematic block diagram illustrating one embodiment of a remote UE apparatus for sidelink control information indication.

FIG. 6 depicts one embodiment of a remote UE apparatus 600 that may be used for sidelink control information indication, according to embodiments of the disclosure. The remote UE apparatus 600 may be one embodiment of the remote unit 105 and/or the remote UE 205. Furthermore, the remote UE apparatus 600 includes a processor 605, a memory 610, an input device 615, a display 620, a transmitter 625, and a receiver 630. In some embodiments, the input device 615 and the display 620 are combined into a single device, such as a touchscreen. In certain embodiments, the remote unit 105 may not include any input device 615 and/or display 620.

The transmitter 625 and receiver 630 are used to communicate with a relay UE using sidelink communication. Here, the sidelink communication is defined within preconfigured sidelink resource pools (PSCCH/PSSCH). Multiple pools can be configured by eNB for sidelink operation. In some embodiments, the sidelink communication uses frequency-division multiplexing ("FDM") between PSCCH and PSSCH, from both a UE and system perspective. In other embodiments, the sidelink communication uses FDM between PSCCH and PSSCH from the system perspective, but uses time-division multiplexing ("TDM") from the UE perspective.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the display 620, the transmitter 625, and the receiver 630.

In some embodiments, the receiver 630 receives an indicator of a transmission-reception pattern in a first control information message. The receiver 630 may also receive an indicator of scheduling assignment transmitted in the first control information message and associated data transmitted in a data message from a relay unit. In response to receiving one or more data processes (e.g., HARQ processes), the processor 605 generates an indicator of hybrid automatic repeat request ("HARQ") feedback information. The processor 605 also determines a transmission subframe of the apparatus based on the received indicator of a transmission-reception pattern. The processor 605 may then control the transmitter 625 to transmit the indicator of HARQ feedback information to the relay unit in a second control information message on a remote unit transmission subframe determined from the transmission-reception pattern.

In some embodiments, receiving the indicator of the transmission-reception pattern includes the receiving a SCI format 1 message and reinterpreting the SCI format 1 message to determine the indicator of the transmission-reception pattern. In one embodiment, receiving the indicator of the transmission-reception pattern includes receiving the indicator of the transmission-reception pattern from the relay unit. In another embodiment, receiving the indicator of the transmission-reception pattern includes receiving the indicator of the transmission-reception pattern from a base unit.

In certain embodiments, the indicator of the transmission-reception pattern may indicate a particular pattern selected from a plurality of predetermined patterns. In one embodiment, the indicator of the transmission-reception pattern comprises a bitmap representing at least one transmission subframe and at least one reception subframe in the transmission-reception pattern. In another embodiment, the indicator of the transmission-reception pattern is an offset value pointing to a next reception subframe in the transmission-reception pattern. In yet another embodiment, the indicator of the transmission-reception pattern is an offset value pointing to a next transmission subframe in the transmission-reception pattern.

In certain embodiments, the second control information message includes a scheduling assignment ("SA") function differentiation flag that indicates whether the second control information message includes HARQ feedback information and whether a data transmission is associated with the second control information message. Additionally, the second control information message may also include a data offset indicating a time offset between the second control information message and the associated data transmission.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to sidelink control information indication, for example storing transmission-reception patterns, indicators, feedback information, and the like. In some embodiments, the memory 610 also stores program code and related data, such as an operating system or other controller algorithms operating on the remote unit 105 and one or more software applications.

The input device 615, in one embodiment, may include any known computer input device including a touch panel, a button, a keyboard, a stylus, a microphone, or the like. In some embodiments, the input device 615 may be integrated with the display 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The display 620, in one embodiment, may include any known electronically controllable display or display device. The display 620 may be designed to output visual, audible, and/or haptic signals. In some embodiments, the display 620 includes an electronic display capable of outputting visual data to a user. For example, the display 620 may include, but is not limited to, an LCD display, an LED display, an OLED display, a projector, or similar display device capable of outputting images, text, or the like to a user. As another, non-limiting, example, the display 620 may include a wearable display such as a smart watch, smart glasses, a heads-up display, or the like. Further, the display 620 may be a component of a smart phone, a personal digital assistant, a television, a table computer, a notebook (laptop) computer, a personal computer, a vehicle dashboard, or the like.

In certain embodiments, the display 620 includes one or more speakers for producing sound. For example, the display 620 may produce an audible alert or notification (e.g., a beep or chime). In some embodiments, the display 620 includes one or more haptic devices for producing vibrations, motion, or other haptic feedback. In some embodiments, all or portions of the display 620 may be integrated with the input device 615. For example, the input device 615 and display 620 may form a touchscreen or similar touch-sensitive display. In other embodiments, the display 620 may be located near the input device 615.

The transmitter 625 and receiver 630 operate under the control of the processor 605 to transmit messages, data, and other signals and also to receive messages, data, and other signals. For example, the processor 605 may selectively activate the transmitter 625 or receiver 630 (or portions thereof) at particular times in order to send and/or receive messages. The remote UE apparatus 600 may include one or more transmitters 625 and one or more receivers 630 for communicating with the relay UE 120 (or relay UE 210).

Figure 7:
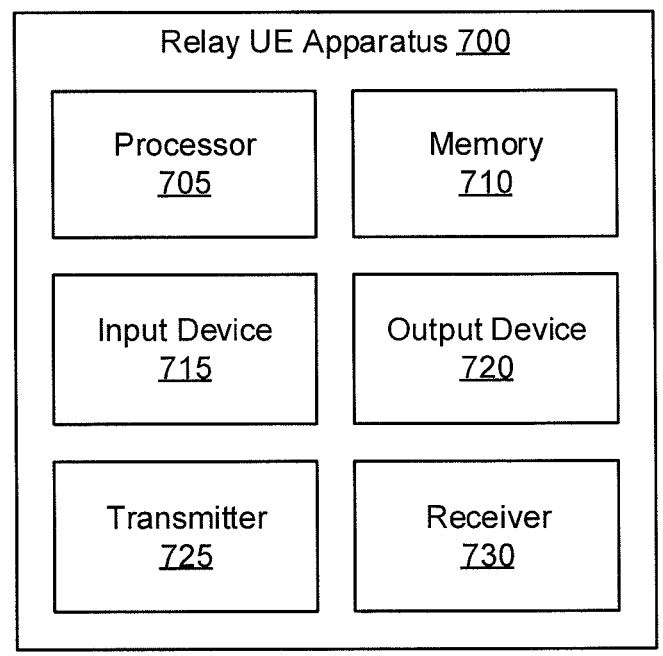
FIG. 7 is a schematic block diagram illustrating one embodiment of a relay UE apparatus for sidelink control information indication.

FIG. 7 depicts one embodiment of a relay UE apparatus 700 that may be used for sidelink control information indication, according to embodiments of the disclosure. The relay UE apparatus 700 may be one embodiment of the relay unit 120 and/or the relay UE 210. Furthermore, the relay UE apparatus 700 includes a processor 705, a memory 710, an input device 715, a display 720, a transmitter 725, and a receiver 730. In some embodiments, the input device 715 and the display 720 are combined into a single device, such as a touchscreen. In certain embodiments, the remote unit 105 may not include any input device 715 and/or display 720.

The transmitter 725 and receiver 730 are used to communicate with a relay UE using sidelink communication. Here, the sidelink communication is defined within preconfigured sidelink resource pools (PSCCH/PSSCH). Multiple pools can be configured by eNB for sidelink operation. In some embodiments, the sidelink communication uses frequency-division multiplexing ("FDM") between PSCCH and PSSCH, from both a UE and system perspective. In other embodiments, the sidelink communication uses FDM between PSCCH and PSSCH from the system perspective, but uses time-division multiplexing ("TDM") from the UE perspective.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the display 720, the transmitter 725, and the receiver 730.

In some embodiments, the receiver 730 receives a second control information message from a remote unit over sidelink communication. Here, the second control information message is in response to the remote unit receiving one or more data processes scheduled by a first control information message from a relay unit, e.g., from the relay UE apparatus 700. The processor 705 determines a transmission-reception pattern for the sidelink communication between the relay UE apparatus 700 and the remote UE. The processor 705 also generates an indicator of the determined transmission-reception pattern. The processor 705 may then control the transmitter 725 to transmit the indicator of the determined transmission-reception pattern to the remote unit in a third control information message. In one embodiment, the first control information message, the second control information message, and the third control information message are transmitted in a same type of control channel (e.g., PSCCH).

In certain embodiments, the processor 705 determines the transmission-reception pattern comprises by determining a ratio of transmission payload to reception payload based on a buffer status of relay unit and/or a buffer status report of one or more remote units. The processor 705 may then generate the transmission-reception pattern based on one or more of: the ratio, the buffer status of relay unit, and the buffer status report of one or more remote units.

In one embodiment, the indicator of the determined transmission-reception pattern comprises a bitmap representing at least one transmission subframe and at least one reception subframe in the generated transmission-reception pattern. In another embodiment, the indicator of the determined transmission-reception pattern is an offset value pointing to a next reception subframe in the generated transmission-reception pattern. In yet another embodiment, the indicator of the determined transmission-reception pattern is an offset value pointing to a next transmission subframe in the generated transmission-reception pattern.

In certain embodiments, the processor 705 determines the transmission-reception pattern comprises by determining a ratio of transmission payload to reception payload based on a buffer status of relay unit and/or a buffer status report of one or more remote units. The processor 705 may then the transmission-reception pattern from a plurality of predetermined patterns based on one or more of: the ratio, the buffer status of relay unit, and the buffer status report of one or more remote units. Here, the indicator of the determined transmission-reception pattern may be a plurality of bits representing the selected transmission-reception pattern. For example, specific bit values may be mapped to specific patterns among the plurality of predetermined patterns.

In some embodiments, third control information message includes an indicator of scheduling assignment ("SA") function differentiation flag. Here, the SA function differentiation flag may indicate whether the third control information message includes hybrid automatic repeat request ("HARQ") feedback information. Where the third control information message includes HARQ feedback information, the third control information message may contain a bitmap representing HARQ feedback information corresponding to one or more HARQ processes.

In certain embodiments, the third control information message includes an indicator of scheduling assignment. Here, the indicator of scheduling assignment indicating an associated data transmission. In further embodiments, the third control information message may include a data offset indicating a time offset between the second SCI message and the associated data transmission.

In some embodiments, generating an indicator of the determined transmission-reception pattern comprises the processor 705 generating a SCI format 1 message to be reinterpreted by the remote UE to indicate the determined transmission-reception pattern. In such embodiments, the processor 705 may modify one or more bit fields of the SCI format 1 message to indicate the transmission-reception pattern.

In certain embodiments, the receiver 730 further receives a fourth control information message from the remote UE. Here, the fourth control information message may include an indicator of whether the fourth control information message contains ("HARQ") feedback information. The fourth control information message may also include an indicator of whether the fourth control information message is associated with a data transmission from the remote UE.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to sidelink control information indication, for example storing transmission-reception patterns, indicators, feedback information, and the like. In certain embodiments, the memory 710 also stores program code and related data, such as an operating system or other controller algorithms operating on the relay UE apparatus 700 and one or more software applications.

The input device 715, in one embodiment, may include any known computer input device including a touch panel, a button, a keyboard, a stylus, a microphone, or the like. In some embodiments, the input device 715 may be integrated with the display 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The display 720, in one embodiment, may include any known electronically controllable display or display device. The display 720 may be designed to output visual, audible, and/or haptic signals. In some embodiments, the display 720 includes an electronic display capable of outputting visual data to a user. For example, the display 720 may include, but is not limited to, an LCD display, an LED display, an OLED display, a projector, or similar display device capable of outputting images, text, or the like to a user. As another, non-limiting, example, the display 720 may include a wearable display such as a smart watch, smart glasses, a heads-up display, or the like. Further, the display 720 may be a component of a smart phone, a personal digital assistant, a television, a table computer, a notebook (laptop) computer, a personal computer, a vehicle dashboard, or the like.

In certain embodiments, the display 720 includes one or more speakers for producing sound. For example, the display 720 may produce an audible alert or notification (e.g., a beep or chime). In some embodiments, the display 720 includes one or more haptic devices for producing vibrations, motion, or other haptic feedback. In some embodiments, all or portions of the display 720 may be integrated with the input device 715. For example, the input device 715 and display 720 may form a touchscreen or similar touch-sensitive display. In other embodiments, the display 720 may be located near the input device 715.

The transmitter 725 and receiver 730 operate under the control of the processor 705 to transmit messages, data, and other signals and also to receive messages, data, and other signals. For example, the processor 705 may selectively activate the transmitter 725 or receiver 730 (or portions thereof) at particular times in order to send and/or receive messages. The relay UE apparatus 700 may include one or more transmitters 725 and one or more receivers 730 for communicating with a remote UE 105 and/or a base unit 110 of a mobile communication network.

Figure 8:
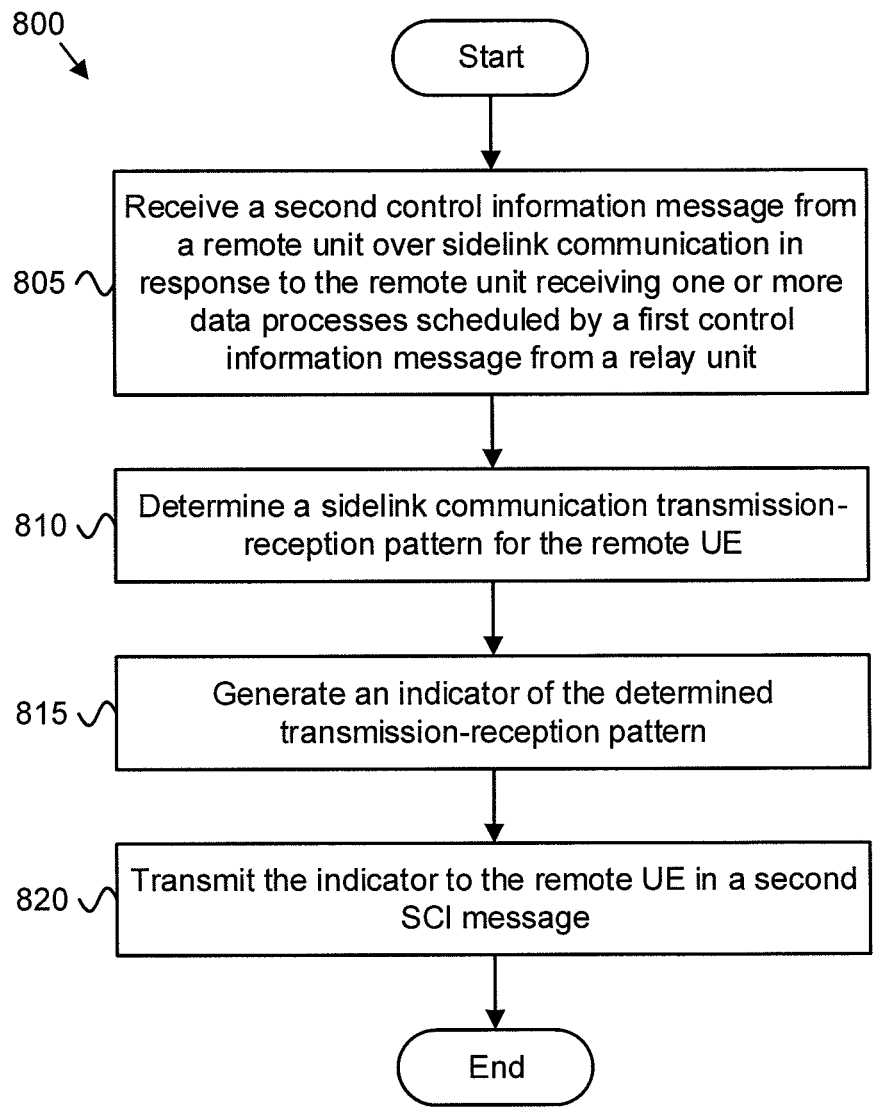
FIG. 8 is a schematic flow chart diagram illustrating one embodiment of a method for sidelink control information indication.

FIG. 8 depicts a method 800 for sidelink control information indication, according to embodiments of the disclosure. In some embodiments, the method 800 is performed by an apparatus, such as the relay unit 120, the relay UE 210, and/or relay UE apparatus 700. In certain embodiments, the method 800 may be performed by a processor executing program code, for example, a microcontroller, a microprocessor, a CPU, a GPU, an auxiliary processing unit, a FPGA, or the like.

The method 800 begins and receives 805 second control information message from a remote unit over sidelink communication. Here, the second control information message is in response to the remote unit receiving one or more data processes scheduled by a first control information message from a relay unit. In some embodiments, the first control information message includes a transmission-reception pattern, wherein the second control information message is received during a reception period of the transmission-reception pattern.

The method 800 includes determining 810 a transmission-reception pattern for a remote unit using sidelink communication. In some embodiments, determining 810 the transmission-reception pattern includes determining a ratio of transmission payload to reception payload based on a buffer status of relay unit and/or a buffer status report of one or more remote units, and further generating the transmission-reception pattern based one or more of: on the ratio, the buffer status of relay unit, and the buffer status report of one or more remote units. In certain embodiments, determining the transmission-reception pattern includes selecting the transmission-reception pattern from a plurality of predetermined patterns based one or more of: on the ratio, the buffer status of relay unit, and the buffer status report of one or more remote units, wherein the indicator of the determined transmission-reception pattern comprises a plurality of bits representing the selected transmission-reception pattern.

The method 800 includes generating 815 an indicator of the determined transmission-reception pattern. In some embodiments, generating 815 an indicator of the determined transmission-reception pattern includes generating a SCI format 1 message to be reinterpreted by the remote unit to indicate the determined transmission-reception pattern.

In one embodiment, the indicator of the determined transmission-reception pattern comprises a bitmap representing at least one transmission subframe and at least one reception subframe in the generated transmission-reception pattern. In another embodiment, the indicator of the determined transmission-reception pattern is an offset value pointing to a next reception subframe in the generated transmission-reception pattern. In yet another embodiment, the indicator of the determined transmission-reception pattern is an offset value pointing to a next transmission subframe in the generated transmission-reception pattern. Where the transmission-reception pattern is selected from a plurality of predetermined patterns, the indicator of the determined transmission-reception pattern may be a plurality of bits representing the selected transmission-reception pattern.

The method 800 includes transmitting 820 the indicator to the remote unit in a third control information message. In one embodiment, the first control information message, the second control information message, and the third control information message are transmitted in a same type of control channel (e.g., PSCCH). In certain embodiments, the third control information message includes an indicator of scheduling assignment ("SA") function differentiation flag, the SA function differentiation flag indicating that the third control information message includes hybrid automatic repeat request ("HARQ") feedback information. Here, the third control information message may include a bitmap representing the HARQ feedback information in response to one or more HARQ process.

In some embodiments, the third control information message includes an indicator of scheduling assignment, the indicator of scheduling assignment indicating that a data transmission is associated with the third control information message. Here, the third control information message may further include a data offset indicating a time offset between the third control information message and the associated data transmission. In certain embodiments, the remote unit sends a fourth control information message in response to the transmitting 820 of the indicator to the remote unit. Here, the fourth control information message includes an indicator of whether the fourth control information message contains ("HARQ") feedback information. In further embodiments, the fourth control information message may include an indicator of whether the fourth control information message is associated with a data transmission from the remote unit. The method 800 ends.

Figure 9:
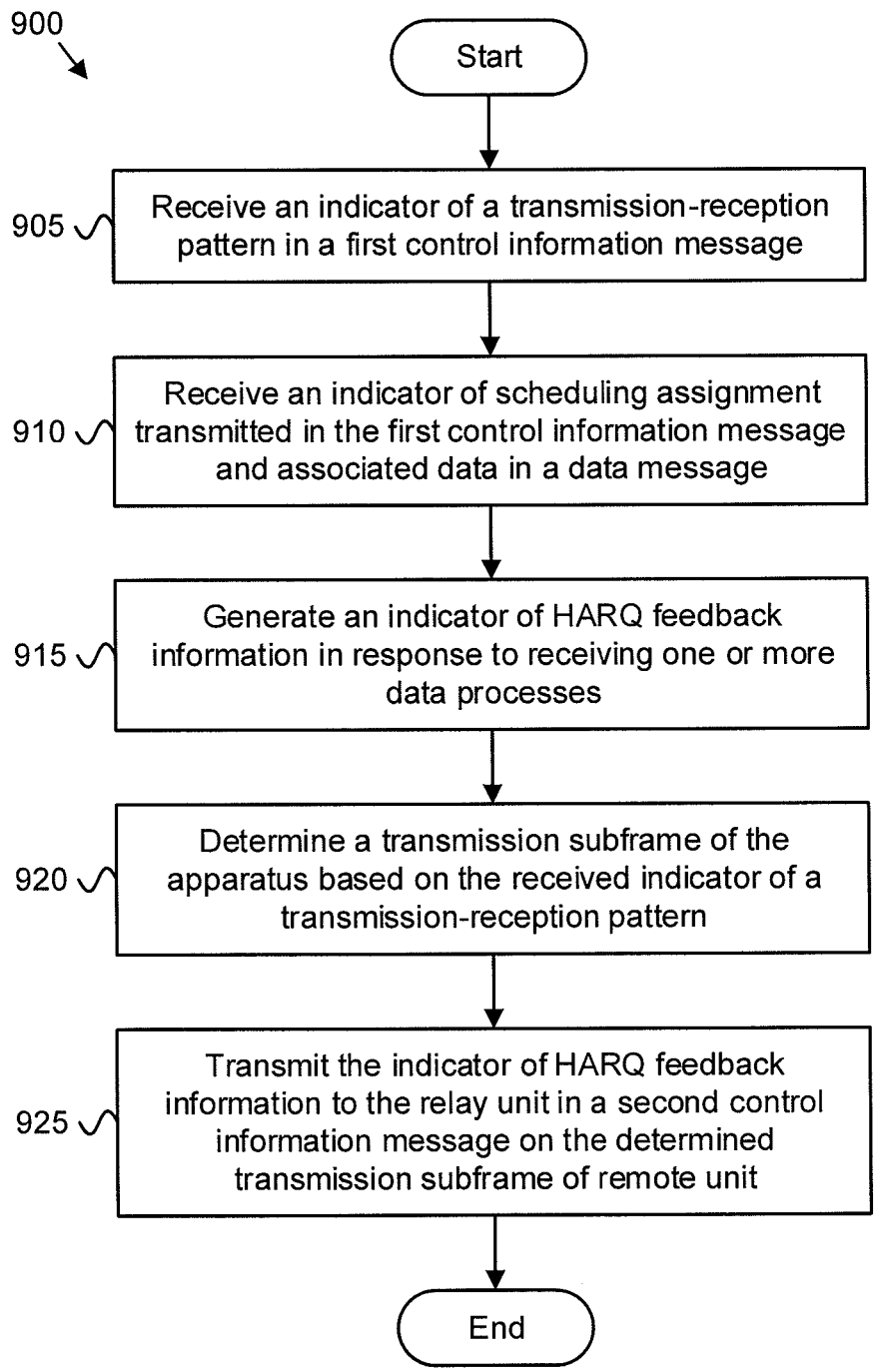
FIG. 9 is a schematic flow chart diagram illustrating another embodiment of a method for sidelink control information indication.

FIG. 9 depicts a method 900 for sidelink control information indication, according to embodiments of the disclosure. In some embodiments, the method 900 is performed by an apparatus, such as the remote unit 105, the remote UE 205, and/or the remote UE apparatus 600. In certain embodiments, the method 900 may be performed by a processor executing program code, for example, a microcontroller, a microprocessor, a CPU, a GPU, an auxiliary processing unit, a FPGA, or the like.

The method 900 begins and receives 905 an indicator of a transmission-reception pattern in a first control information message. In one embodiment, the first control information message is a sidelink control information ("SCI") message. In another embodiment, the first control information message is a downlink control information ("DCI") message.

The method 900 includes receiving 910 an indicator of scheduling assignment transmitted in the first control information message and associated data transmitted in a data channel from a relay unit. In one embodiment, the associated data is received via a sidelink data message. In some embodiments, receiving 910 the indicator of the transmis-sion-reception pattern comprises receiving a SCI format 1 message and reinterpreting the SCI format 1 message to determine the indicator of the transmission-reception pattern. In one embodiment, receiving 910 the indicator of the transmission-reception pattern comprises receiving the indicator of the transmission-reception pattern from the relay unit. In another embodiment, receiving 910 the indicator of the transmission-reception pattern comprises receiving the indicator of the transmission-reception pattern from a base unit.

The method 900 includes generating 915 an indicator of hybrid automatic repeat request ("HARQ") feedback information in response to the received one or more data processes. In one embodiment, the one or more data processes are one or more HARQ processes. In some embodiments, the indicator of the transmission-reception pattern indicates a particular pattern selected from a plurality of predetermined patterns. In one embodiment, the indicator of the transmission-reception pattern comprises a bitmap representing at least one transmission subframe and at least one reception subframe in the transmission-reception pattern. In another embodiment, the indicator of the transmission-reception pattern is an offset value pointing to a next reception subframe in the transmission-reception pattern. In yet another embodiment, the indicator of the transmission-reception pattern is an offset value pointing to a next transmission subframe in the transmission-reception pattern.

The method 900 includes determining 920 a transmission subframe of the apparatus based on the received indicator of a transmission-reception pattern. The method 900 includes transmitting 925 the indicator of HARQ feedback information to the relay unit in a second control information message on a transmission subframe of remote unit determined from the transmission-reception pattern. In one embodiment, the second control information message is a SCI message. In some embodiments, the second control information message includes a scheduling assignment ("SA") function differentiation flag that indicates whether the second control information message includes HARQ feedback information and whether a data transmission is associated with the second control information message. In certain embodiments, the second control information message further includes a data offset indicating a time offset between the second control information message and the associated data transmission. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a receiver that:
  receives a second control information message from a remote unit over sidelink communication, wherein the second control information message is in response to the remote unit receiving one or more data processes scheduled by a first control information message from a relay unit;
 a processor that:
  determines a transmission-reception pattern for the sidelink communication;
  generates an indicator of the determined transmission-reception pattern; and a transmitter that:
   transmits the indicator of the determined transmission-reception pattern to the remote unit in a third control information message.

2. The apparatus of claim 1, wherein the first control information message, the second control information message, and the third control information message are transmitted in a same type of control channel.

3. The apparatus of claim 1, wherein determining the transmission-reception pattern comprises the processor:
   determining a ratio of transmission payload to reception payload based on one of a buffer status of relay unit and a buffer status report of one or more remote units; and
   generating the transmission-reception pattern based on one or more of: the ratio, the buffer status of relay unit, and the buffer status report of one or more remote units.

4. The apparatus of claim 3, wherein the indicator of the determined transmission-reception pattern comprises a bitmap representing at least one transmission time unit and at least one reception time unit in the generated transmission-reception pattern.

5. The apparatus of claim 3, wherein the indicator of the determined transmission-reception pattern is an offset value pointing to a next reception time unit in the generated transmission-reception pattern or to a next transmission time unit in the generated transmission-reception pattern.

6. The apparatus of claim 1, wherein determining the transmission-reception pattern comprises the processor:
   determining a ratio of transmission payload to reception payload based on one of: a buffer status of relay unit and a buffer status report of one or more remote units; and
   selecting the transmission-reception pattern from a plurality of predetermined patterns based on one or more of: the ratio, the buffer status of relay unit, and the buffer status report of one or more remote units, wherein the indicator of the determined transmission-reception pattern comprises a plurality of bits representing the selected transmission-reception pattern.

7. The apparatus of claim 1, wherein the third control information message includes an indicator of scheduling assignment ("SA") function differentiation flag, the SA function differentiation flag indicating that the third control information message includes hybrid automatic repeat request ("HARQ") feedback information.

8. The apparatus of claim 7, wherein the third control information message includes a bitmap representing the HARQ feedback information in response to one or more HARQ processes.

9. The apparatus of claim 1, wherein the third control information message includes an indicator of scheduling assignment, the indicator of scheduling assignment indicating an associated data transmission.

10. The apparatus of claim 9, wherein the third control information message further includes a data offset indicating a time offset between the third control information message and the associated data transmission.

11. The apparatus of claim 1, wherein the receiver further receives a fourth control information message from the remote unit, the fourth control information message including an indicator of whether the fourth control information message contains hybrid automatic repeat request ("HARQ") feedback information.

12. The apparatus of claim 11, wherein the fourth control information message further includes an indicator of whether the fourth control information message is associated with a data transmission from the remote unit.

13. An apparatus comprising
a receiver that:
   receives an indicator of a transmission-reception pattern in a first control information message;
   receives an indicator of scheduling assignment transmitted in the first control information message and associated data transmitted in a data message from a relay unit;
a processor that:
   generates an indicator of hybrid automatic repeat request ("HARQ");
   feedback information in response to receiving one or more data processes;
   determines a transmission time unit of the apparatus based on the received indicator of a transmission-reception pattern; and
a transmitter that:
   transmits the indicator of HARQ feedback information to the relay unit in a second control information message on the determined transmission time unit of the apparatus.

14. The apparatus of claim 13, wherein receiving the indicator of the transmission-reception pattern comprises the processor receiving the indicator of the transmission-reception pattern from the relay unit.

15. The apparatus of claim 13, wherein receiving the indicator of the transmission-reception pattern comprises the processor receiving the indicator of the transmission-reception pattern from a base unit.

16. The apparatus of claim 13, wherein the indicator of the transmission-reception pattern comprises a bitmap representing at least one transmission time unit and at least one reception time unit in the transmission-reception pattern.

17. The apparatus of claim 13, wherein the indicator of the transmission-reception pattern is an offset value pointing to a next reception time unit in the transmission-reception pattern or to a next transmission time unit in the generated transmission-reception pattern.

18. The apparatus of claim 13, wherein the indicator of the transmission-reception pattern indicates a particular pattern selected from a plurality of predetermined patterns.

19. The apparatus of claim 13, wherein the second control information message includes a scheduling assignment ("SA") function differentiation flag that indicates whether the second control information message includes HARQ feedback information and whether a data transmission is associated with the second control information message.

20. The apparatus of claim 19, wherein the second control information message further includes a data offset indicating a time offset between the second control information message and the associated data transmission.

* * * * *